United States Patent [19]
Yoshida

[11] Patent Number: 5,459,721
[45] Date of Patent: Oct. 17, 1995

[54] CALLED EQUIPMENT SELECTION METHOD IN ISDN PACKET SWITCHING MODE AND PACKET SWITCHING SYSTEM FOR DIGITAL NETWORK

[75] Inventor: Atsumasa Yoshida, Tokyo, Japan

[73] Assignee: NEC Corporation, Tokyo, Japan

[21] Appl. No.: 261,383

[22] Filed: Jun. 15, 1994

[30] Foreign Application Priority Data

Jun. 18, 1993 [JP] Japan .................................. 5-172421

[51] Int. Cl.[6] .................................................. H04L 12/56
[52] U.S. Cl. .......................................... 370/60; 370/85.13
[58] Field of Search ..................... 370/60, 85.13, 370/85.14, 94.1; 395/325

[56] References Cited

U.S. PATENT DOCUMENTS

| | | | |
|---|---|---|---|
| 5,181,199 | 1/1993 | Motoki et al. | 370/60 |
| 5,245,606 | 9/1993 | DeSouza | 370/85.13 |
| 5,251,213 | 10/1993 | Videlock et al. | 370/85.13 |
| 5,309,442 | 5/1994 | Saeki | 370/94.1 |
| 5,329,527 | 7/1994 | Ujihashi et al. | 370/85.13 |

FOREIGN PATENT DOCUMENTS 2-97193  4/1990  Japan .
3-88534  4/1991  Japan .

Primary Examiner—Benedict V. Safourek
Attorney, Agent, or Firm—Foley & Lardner

[57] ABSTRACT

A packet switching method in a digital network includes a calling equipment and called equipment connected to the digital network for communication by packet switching, and further includes a destination end system to be connected to the called equipment for communication. Upon occurrence of a call demand by the calling equipment, a sub-address of the called equipment and a network address of the destination end system are inserted in a call demand packet and the call demand packet is transmitted to the digital network. Upon reception of a call setup message by the called equipment from the digital network which receives the call demand packet, the sub-address from the call setup message is extracted and a judgement is made as to whether the incoming call is designated to own equipment by checking matching of the extracted sub-address and a given sub-address assigned to own equipment. A response message to the digital network is transmitted when the incoming call is judged to designate own equipment. Upon the called equipment's reception of an incoming call packet which was transmitted by the digital network after receiving the response message, the network address from the incoming call packet is extracted and incoming call processing is performed based on the extracted network address for establishing the call.

12 Claims, 8 Drawing Sheets

CALLED EQUIPMENT SELECTION METHOD IN ISDN PACKET SWITCHING MODE AND PACKET SWITCHING SYSTEM FOR DIGITAL NETWORK

BACKGROUND OF THE INVENTION

1. Field of the Invention

The present invention relates generally to a call connection between communication equipments using an ISDN packet switching mode service. More specifically, the invention relates to a method for selecting a called equipment.

2. Description of the Related Art

Conventionally, when a called equipment is to be selected in an ISDN packet switching mode, selection has been performed in response to call demand based on CCITT recommendation X.25, by setting a network address (for example, the address corresponding to NSAP address under OSI environment) of a destination end system connected to the called equipment in an address value field in a called address extending facility of a call demand packet under X.25. Such system has been disclosed in Japanese Unexamined Patent publication No. Heisei 2-97193 and Japanese Unexamined Patent Publication No. Heisei 3-88534 and its U.S. equivalent, U.S. Pat. No. 5,181,199.

It should be appreciated that, in this case, an ISDN network feeds the same content which is same as the address value facility in response to the call remand under X.25 according to CCITT recommendation Q.93 with mapping the content in the address value field in a called sub-address information factor of a call setup message as one of ISDN call control messages. Then, in the called equipment, judgement is made whether the call is designated to the own equipment or not on the basis of a network address set in the address value field in the call setup message.

However, the sub-address set in the incoming call sub-address information factor of the call setup message is originally for supplementing ISDN number (number of channel assigned for a terminal upon subscribing ISDN). Namely, the sub-address is an identifier for a plurality of equipments belonging an interface, to which the ISDN number is assigned. This sub-address is different from the network address as the identifier of the destination end system and rather a more physical address depending upon a sub-network. Accordingly, in the conventional method as set forth above, it is forced to use the network address having a logical meaning as the physical sub-address.

Therefore, in the called ISDN terminal (including a terminal adapter) under a multi-point connection environment, it becomes necessary to manage one or more network address groups presented in one terminal equipment as sub-addresses of own terminal equipment. Therefore, large amount of sub-address information has to be managed by the called terminal equipment.

Especially, when the called equipment under the multi-point connection environment serves as a router for other network environment, such as from ISDN to LAN or so forth, such router equipment has to manage huge amount of network addresses of other network environment connected therefrom.

Furthermore, when a plurality of protocol is present within the called ISDN terminal equipment, not only the sub-address information becomes huge, but also the protocol discrimination becomes necessary upon the called terminal section since formats of the protocols are differentiated in every network systems. Therefore, the processing load of the called ISDN terminal equipment is increased.

SUMMARY OF THE INVENTION

It is an object of the present invention to make it possible to reduce number of sub-address information to be managed by a called terminal equipment, and make protocol discrimination upon called terminal selection.

Another object of the present invention is to permit judgement for the arriving call if it is designated to the own equipment by managing only one sub-address of own terminal independent of one or more network address groups present in one terminal equipment under multi-point connection environment.

A further object of the present invention is to require management of only one sub-address independent of a huge amount of network address of other network environment connected to own equipment even in the case where the called equipment under multi-point connection environment is serving as a router from the ISDN environment to other network environment, such as LAN or so forth.

A still further object of the present invention is to make it unnecessary to perform an address matching check process upon selection of equipment based on the network address and whereby to reduce process load of the called equipment by eliminating necessity of protocol discrimination upon selection of the called terminal even when a plurality of protocols are present in the called equipment.

According to the first aspect of the invention, a called equipment selection method in a packet switching mode in a digital network including a calling equipment and called equipments connected to the digital network for communication with packet switching, and further including a destination end system as an objective equipment to be connected to the called equipment for communication, comprises the steps of:

upon occurrence of call demand of the calling equipment, setting a sub-address of the called equipment and a network address of the destination end system in a call demand packet and transmitting the call demand packet to the digital network;

upon reception of a call setup message by the called equipment from the digital network which receives the call demand packet, extracting the sub-address from the call setup message and making judgement whether the incoming call is designated to own equipment by checking matching of the extracted sub-address and a given sub-address assigned to own equipment, and transmitting a response message to the digital network when the incoming call designated to own equipment is judged; and upon reception of incoming call packet by the called equipment transmitted from the digital network receiving the response message after establishment of call, extracting the network address from the incoming call packet and performing incoming call processing based on the extracted network address.

In the preferred construction, the called equipment selection method in a packet switching mode of a digital network further comprises the steps of:

upon call demanding, setting the sub-address of the called equipment and the network address of the destination end system in an address value field of a incoming call address extending facility of the call demand packet;

upon reception of call setup message by the called equipment, extracting the sub-address from the address value field of a destination sub-address information factor of the call setup message; and upon reception of the incoming packet by the called equipment, extracting the network address from the address field of the incoming call address extending facility. Also, the called equipment selection method in a packet switching mode of a digital network may which further comprise the step of dividing the sub-address and the network address set in the call demand packet by a delimiter. On the other hand, the called equipment selection method in a packet switching mode of a digital network may further comprise the step of dividing the sub-address and the network address set in the call demand packet by a delimiter.

In the further preferred construction, the called equipment selection method in a packet switching mode of a digital network further comprises the steps of:

checking correctness of the address length of the network address extracted from the incoming call packet upon reception of the incoming call packet by the called equipment;

making judgement that the address length of the network address is correct whenever the length of the address value field of the incoming call address extending facility of the incoming packet is smaller than or equal to a maximum length of the network address to be set, in address length check; and making check of correctness on the basis of the address length of the network address actually extracted without depending upon the address value field when the length of the address value field of the incoming address extending facility of the incoming call packet.

According to the second aspect of the invention, a called equipment selection method in a packet switching mode in a ISDN network including a calling equipment and called equipments connected to the ISDN network for communication with packet switching, and further including a destination end system as an objective equipment to be connected to the called equipment for communication, comprises the steps of:

upon occurrence of call demand of the calling equipment, setting a sub-address of the called equipment and a network address of the destination end system in an address value field of an incoming call address extending facility of a call demand packet and transmitting the call demand packet to the ISDN network;

upon reception of a call setup message by the called equipment from the ISDN network which receives the call demand packet, extracting the sub-address from an address value field of a destination sub-address information factor of the call setup message and making judgement whether the incoming call is designated to own equipment by checking matching of the extracted sub-address and a given sub-address assigned to own equipment, and transmitting a response message to the ISDN network when the incoming call designated to own equipment is judged; and upon reception of incoming call packet by the called equipment transmitted from the ISDN network receiving the response message after establishment of call, extracting the network address from the incoming call packet and performing incoming call processing based on the extracted network address.

Preferably, the called equipment selection method in a packet switching mode of a ISDN network further comprises the step of dividing the sub-address and the network address set in the address value field of the call demand packet by a delimiter. Also, the called equipment selection method in a packet switching mode of a ISDN network may further comprise the steps of:

checking correctness of the address length of the network address extracted from the incoming call packet upon reception of the incoming call packet by the called equipment;

making judgement that the address length of the network address is correct whenever the length of the address value field of the incoming call address extending facility of the incoming packet is smaller than or equal to a maximum length of the network address to be set, in address length check; and making check of correctness on the basis of the address length of the network address actually extracted without depending upon the address value field when the length of the address value field of the incoming address extending facility of the incoming call packet.

According to the third aspect of the invention, a packet switching system in a digital network including a calling equipment and called equipments connected to the digital network for communication with packet switching, and further including a destination end system as an objective equipment to be connected to the called equipment for communication, comprises the steps of:

the calling equipment including an address setting means for setting a sub-address of the called equipment and a network address of the destination end system in a call demand packet and transmitting the call demand packet to the digital network,upon occurrence of call demand of the calling equipment;

the called equipment including an address extracting and matching check means for extracting the sub-address from the call setup message and making judgement whether the incoming call is designated to own equipment by checking matching of the extracted sub-address and a given sub-address assigned to own equipment, and transmitting a response message to the digital network when the incoming call designated to own equipment is judged, upon reception of a call setup message by the called equipment from the digital network which receives the call demand packet; and call receiving means for extracting the network address from the incoming call packet and performing incoming call processing based on the extracted network address, upon reception of incoming call packet by the called equipment transmitted from the digital network receiving the response message after establishment of call.

Preferably, the address setting means of the calling equipment divides the sub-address and the network address set by a delimiter and set in the address value field of the call demand packet by a delimiter. Also, the call receiving means includes an address checking means for checking correctness of the address length of the network address extracted from the incoming call packet upon reception of the incoming call packet by the called equipment;

making judgement that the address length of the network address is correct whenever the length of the address value field of the incoming call address extending facility of the incoming packet is smaller than or equal to a maximum length of the network address to be set, in address length check; and making check of correctness on the basis of the address length of the network address actually extracted without depending upon the address value field when the length of the address value field of the incoming address extending facility of the incoming call packet.

Other objects, features and advantages of the present invention will become clear from the detailed description given hereinafter.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the present invention, but are for explanation and understanding only.

In the drawings.

DESCRIPTION OF THE PREFERRED EMBODIMENT

In the following description, numerous specific details are set forth in order to provide a thorough understanding of the present invention. It will be obvious, however, to those skilled in the art that the present invention may be practiced without these specific details. In other instances, well-known structures are not shown in detail in order not to unnecessary obscure the present invention.

Figure 5:
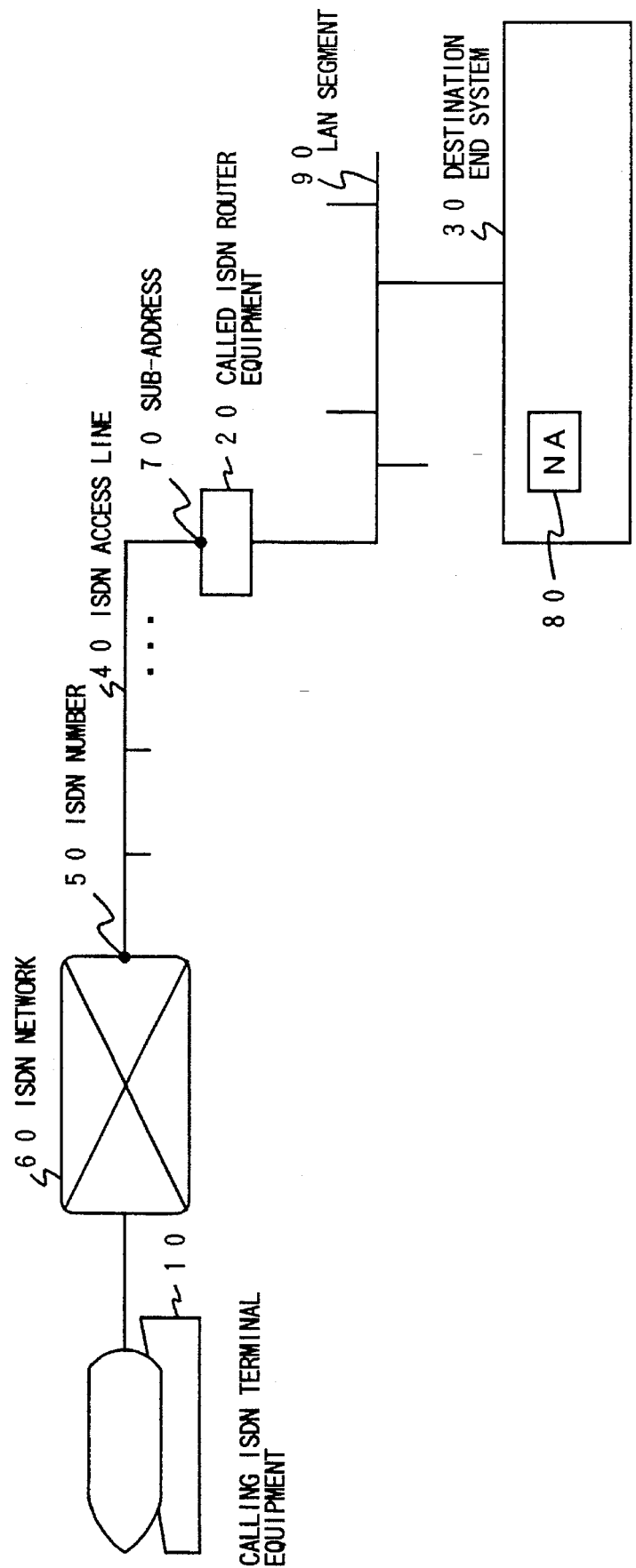
FIG. 5 is an illustration showing one embodiment of a system for implementing one embodiment of a called equipment selection method in ISDN packet switching mode according to the present invention.
Figure 6:
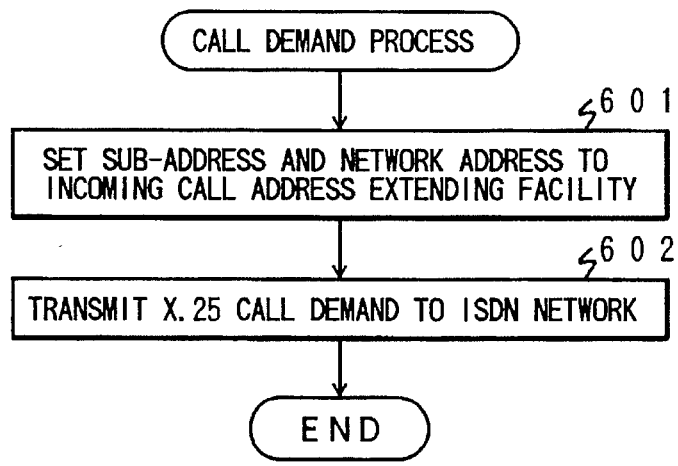
FIG. 6 is a flowchart showing call demand process of the calling ISDN terminal equipment.

The preferred embodiment of the present invention will be discussed hereinafter with reference to the accompanying drawings. FIG. 5 shows one embodiment of a system for implementing one embodiment of a called equipment selection method in ISDN packet switching mode according to the present invention.

Figure 1:
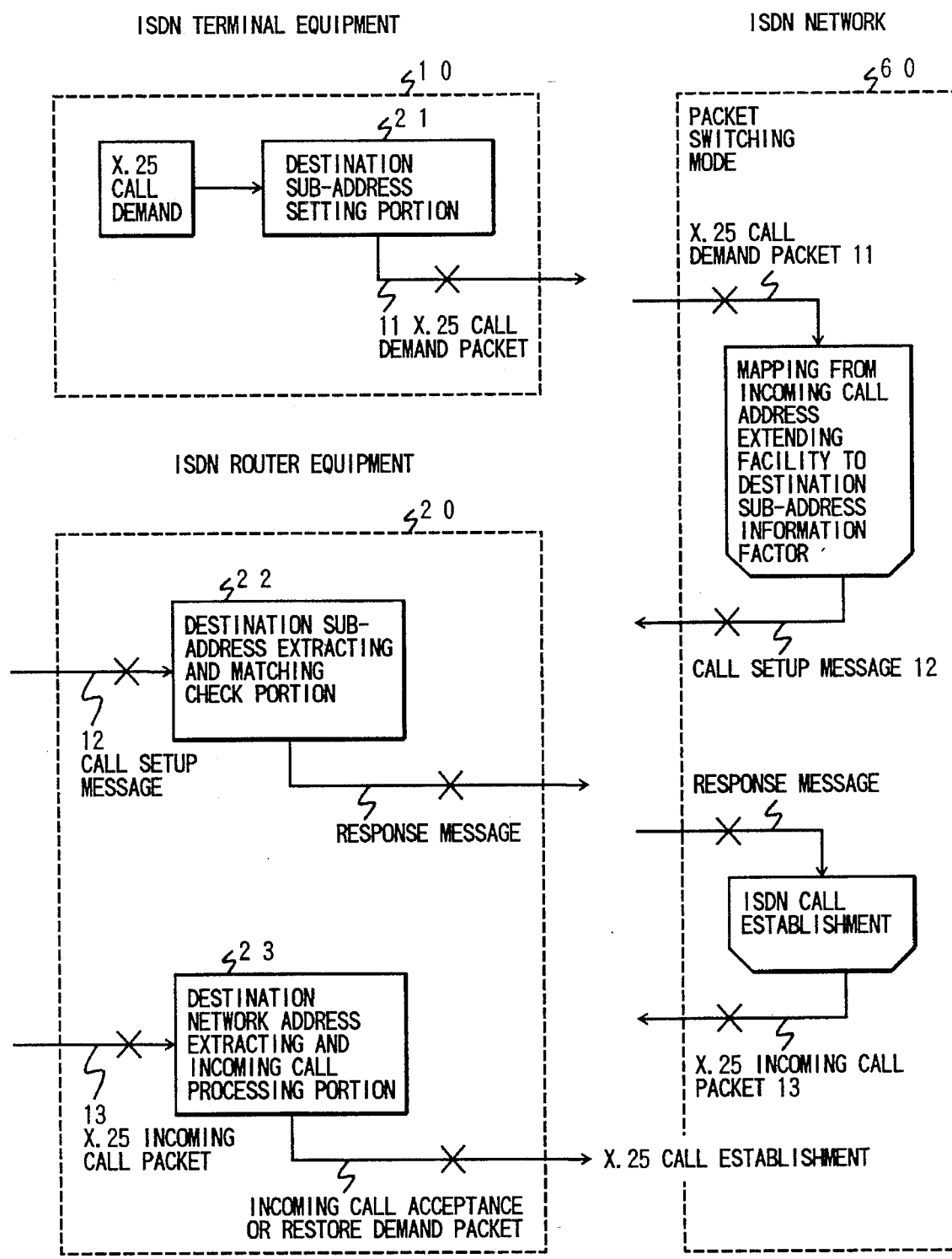
FIG. 1 is an explanatory illustration showing construction and operation of a system comprising a calling ISDN terminal equipment, a called ISDN terminal equipment and an ISDN network.

In FIG. 5, a calling ISDN terminal equipment 10 and a called ISDN router equipment 20 which has network layer relay functions use an ISDN packet switching mode service provided by an ISDN network 60. The called ISDN router equipment as one of a called ISDN equipment is connected by a multi-point connection to an ISDN access line 40 of an ISDN number 50 of the ISDN network 60. Also, the called ISDN router equipment includes a LAN segment 90. In FIG. 1, only destination end system 30 connected to the LAN segment 90 is illustrated, and other destination end systems are neglected from illustration. Also, for the destination end system 30, a network address (NA) 80 is assigned.

For the called ISDN router equipment 20, a sub-address 70 on the ISDN is assigned. The sub-address 70 of the ISDN assigned to the called router equipment 20 is a physical address independent of the network address (NA) 80 of each destination end system connected to the LAN segment 90.

FIG. 1 is an explanatory illustration of major construction and operation of the calling ISDN terminal equipment 10, the called ISDN router equipment 20 and the ISDN network 60.

The calling ISDN terminal equipment 10 includes a destination sub-address setting portion 21 for setting the sub-address of the called ISDN terminal equipment designated to call and the network address of the destination end system in pair to the incoming address extending facility of the call demand packet on the basis of the CCITT recommendation X.25. Also, the called ISDN router equipment 20 includes a destination sub-address extracting and matching check portion 22 which extracts only sub-address from an address value field in the destination sub-address information factor of the call setup message from the ISDN network 60 and checks address matching, and a destination network address extracting and incoming call processing portion 23 for extracting the network address from the address value field of the incoming call address extending facility of the X.25 incoming packet from the ISDN network 60, and establish the call on the basis of X.25 by incoming call process with the extracted network address.

Figure 2:
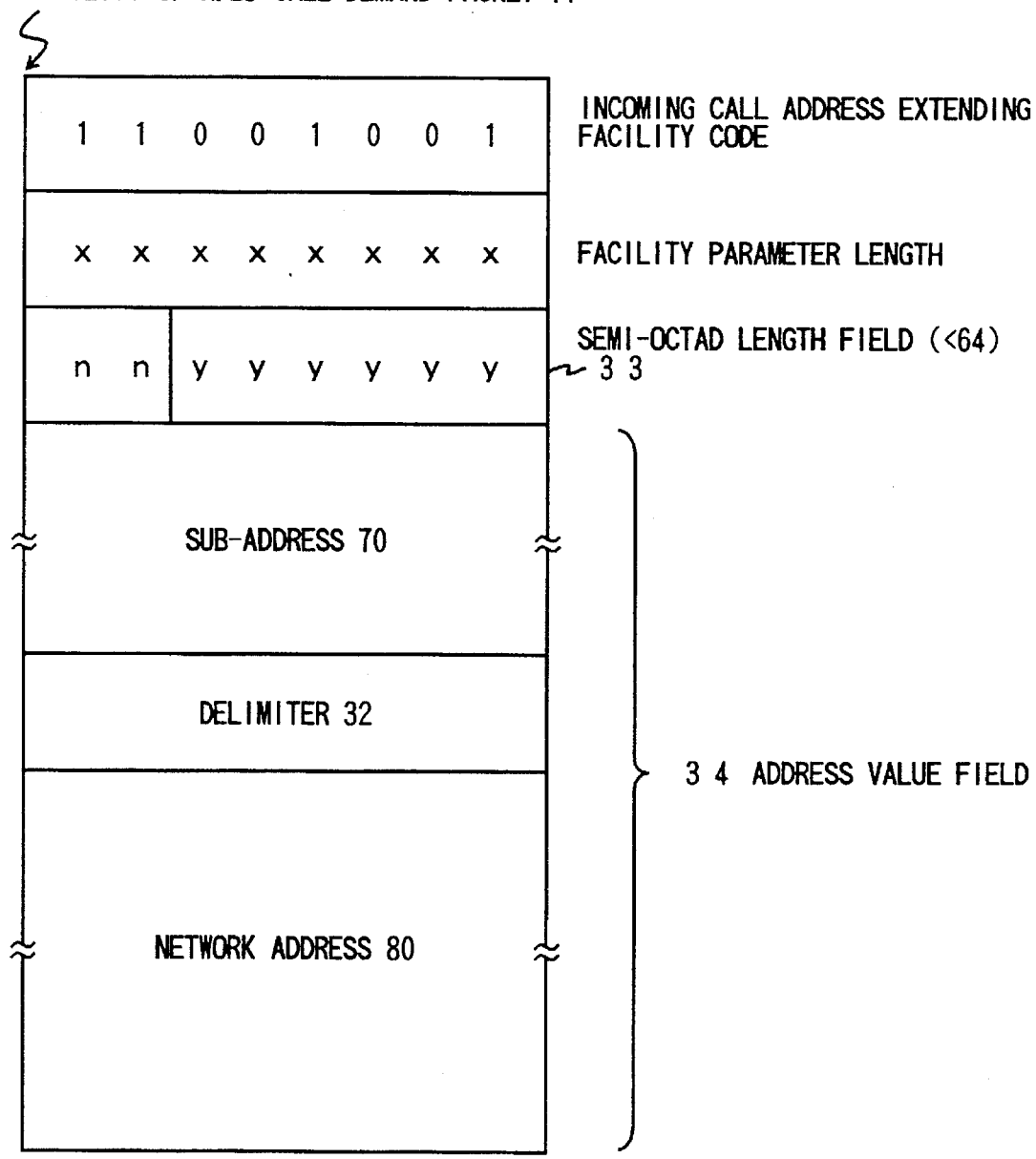
FIG. 2 is an illustration showing an example of an incoming call address extending facility of a call demand packet on the basis of CCITT recommendation X.25.
Figure 3:
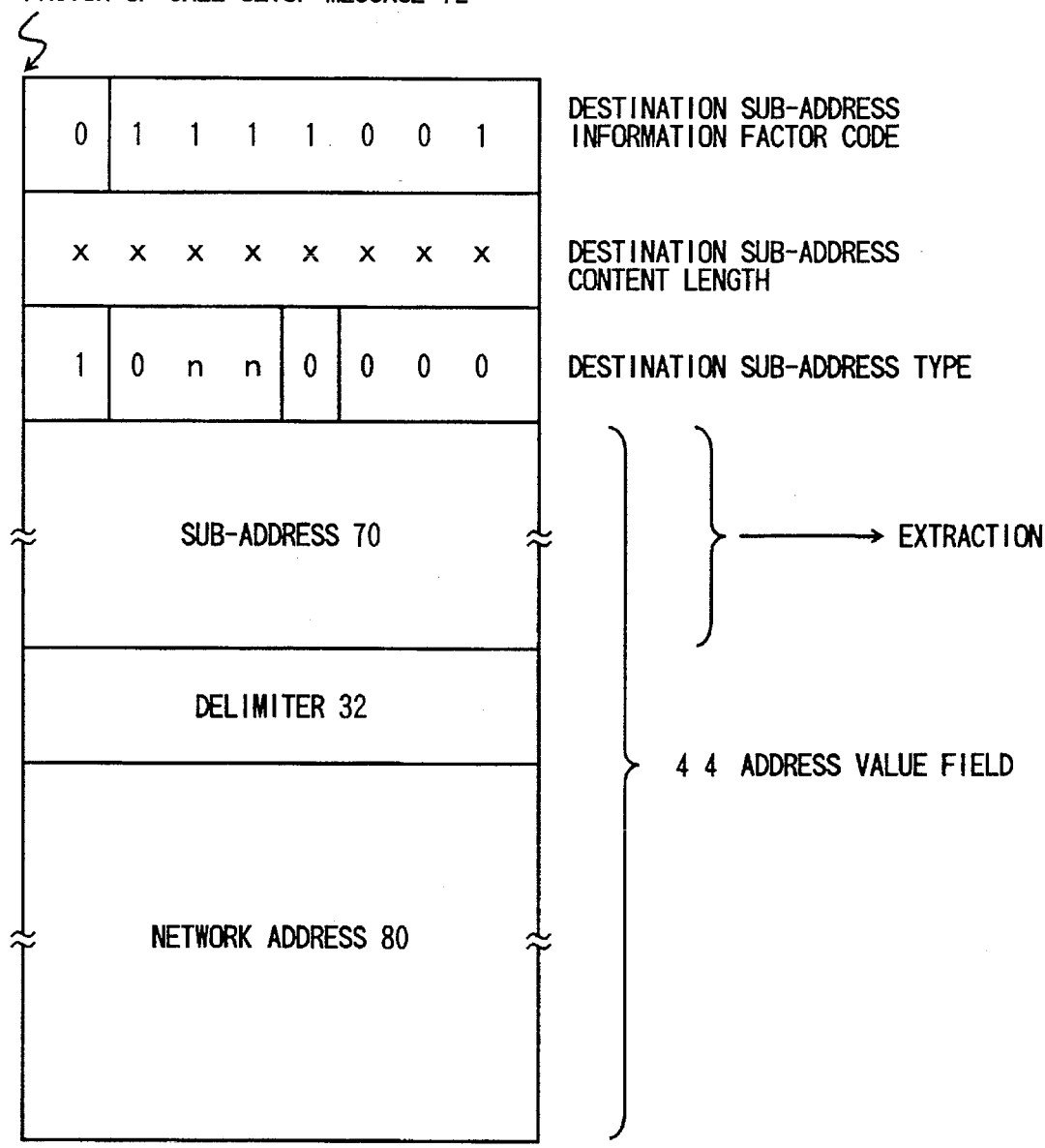
FIG. 3 is an illustration showing an example of a format of a destination sub-address information factor of a cell setting message.
Figure 4:
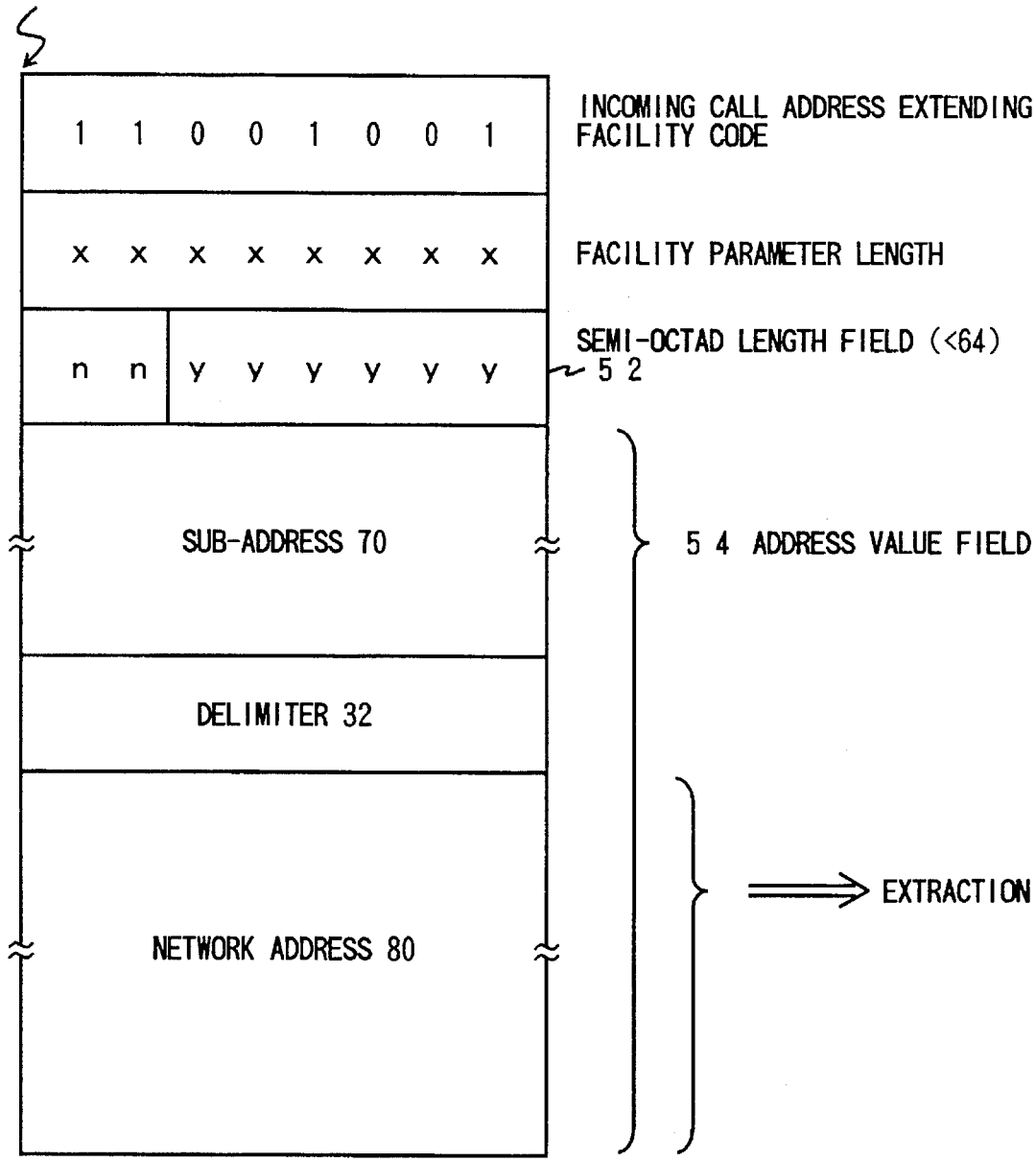
FIG. 4 is an illustration showing an example of a format of an incoming call address extending facility of a call demand packet on the basis of CCITT recommendation X.25.

FIG. 2 shows an example of a format of the incoming call address expanded facility of the X.25 call remand packet. FIG. 3 shows an example of format of the destination sub-address information factor of the call setup message on the basis of CCITT recommendation Q.931. FIG. 4 shows an example of a format of the incoming call address extending facility of the X.25 incoming packet.

Hereinafter, the operation of the shown embodiment will be discussed with reference to FIGS. 6 to 10. At first, discussion will be given for calling operation in the calling ISDN terminal equipment with reference to FIG. 6. Here, the calling ISDN terminal equipment 10 in FIG. 5 is connected to the LAN segment 90 in the called ISDN router equipment 20. An example is given for the case where call is to be made to the destination end system 30 of the network address 80. The calling ISDN terminal equipment 10 sets a pair of the sub-address of the called ISDN router equipment in the destination end system 30 and the network address of the destination end system, in the incoming call address extending facility of the call demand packet X.25, as shown in FIG. 2, by means of the destination sub-address setting portion 21 for the call demand packet of FIG. 1 (step 601).

In the incoming call address extending facility of the X.25 call demand packet of FIG. 2, the incoming call address extending facility code indicates that the following region therefrom is the incoming call address extending facility region, and a facility parameter indicates the length of the incoming call address extending facility region. A semi-octad length field 33 sets the length of the address value field 34. In the conventional system, only the network address is set in the address value field 34.

As the concert setting process, the sub-address 70 and the network address 80 are divided by a delimiter 32 (division identification code), and then are set in the address value field 34 in order. Also, a total length (including a delimit length) of the sub-address length and the network address length is set in the semi-octad length field 33. Concerning the delimiter 32, a code which is not used in the sub-address 70 and the network address 80 is preliminarily determined.

It should be appreciated that the maximum value of the address length to be set in the address value field 34 is generally limited to 40 semi-octad. However, since the length of the semi-octad length field 33 is 6 bits (shown as "yyyyy"), it can be extended up to $2^6-1$, i.e. 64 semi-octad. Therefore, even when the total length of the sub-address length and the network address length including the delimiter 32 exceeds 40 semi-octad, the destination sub-address setting portion 21 can set the two addresses in the incoming call address extending facility 31 according to the setting method set forth above as long as the total length is less than 64 semi-octad.

Then, the calling ISDN terminal equipment 10 transmits the X.25 call demand packet 11 to the ISDN network 60 as shown in FIG. 1.

Figure 7:
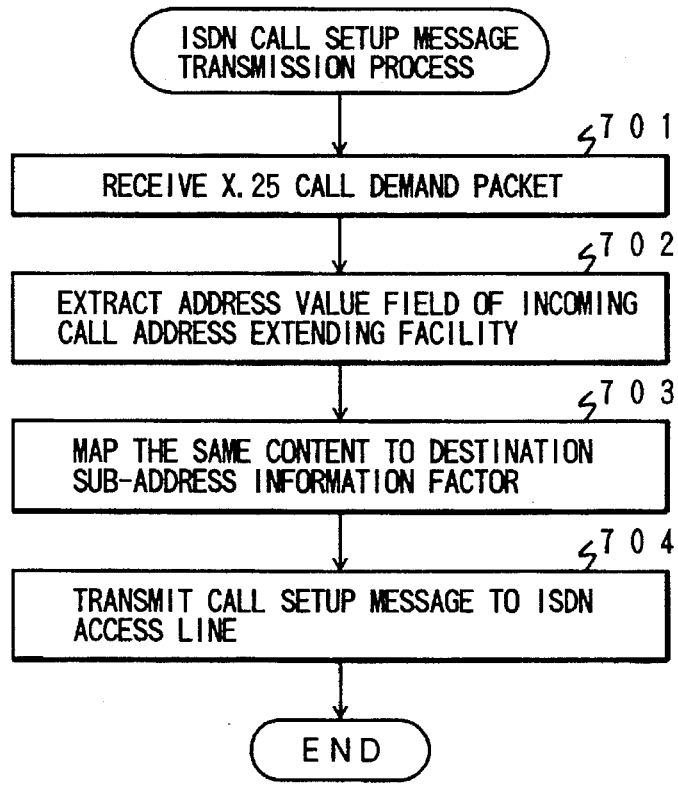
FIG. 7 is a flowchart showing a call setup message transmitting process by a packet switch in the ISDN network.

Next, the transmission process of the call setup message by the packet switch of the ISDN network 60 will be discussed with reference to FIG. 7. The packet switch of the ISDN network 60 receives the X.25 call demand packet 11 from the calling ISDN terminal equipment 10 (step 701). Then, the packet switch extracts the address value field 34 of the incoming call address extending facility 31 shown in FIG. 2 according to CCITT recommendation Q.931 (step 702). Subsequently, the packet switch performs mapping of the same content to the extracted address value field 34 to the address value field 44 in the destination sub-address information factor 41 of the call setup message as the ISDN call control message (step 703). Thereafter, the packet switch transmits the call setup message 12 to the called ISDN access line 40 (step 704).

In the destination sub-address information factor 41 of the call setup message on the basis of CCITT recommendation Q.931, in FIG. 3, the destination address information factor code indicates that the following therefrom is the destination address information factor region. An incoming call address content length is indicative of the length of the destination address information factor region. The semi-octad length field 33 sets the length of the address value field 34.

Figure 8:
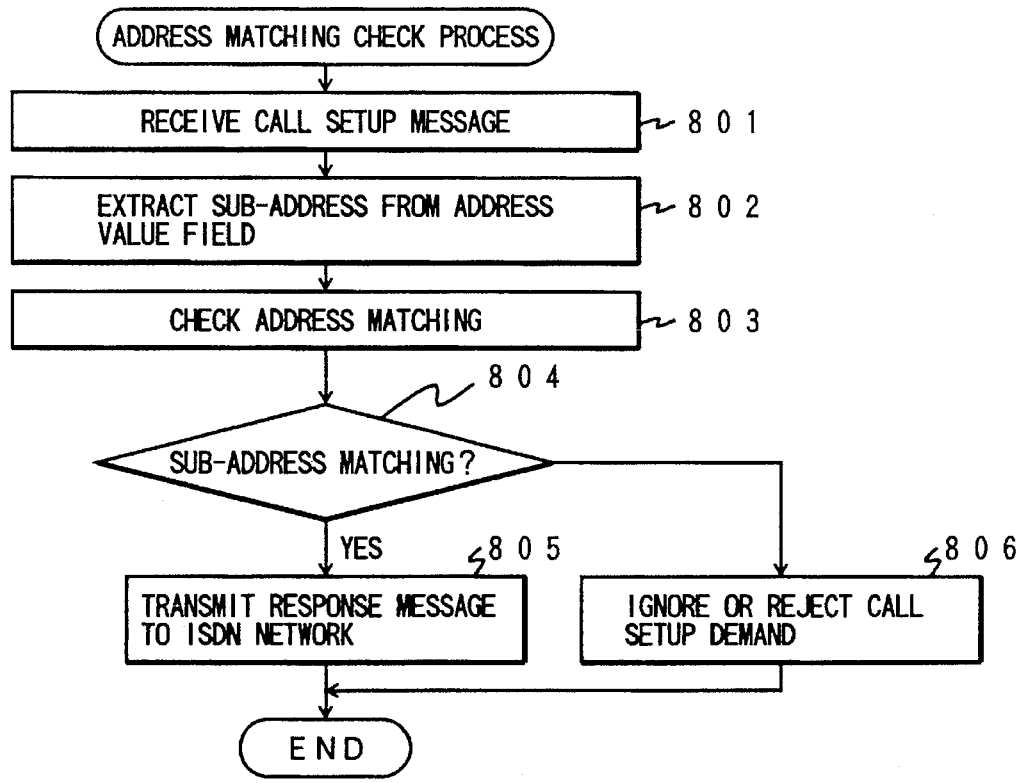
FIG. 8 is a flowchart showing an address matching check process in the called ISDN router equipment.

A matching check process in the called ISDN router equipment 20 will be discussed with reference to FIG. 8. The called ISDN router equipment 20 receives the call setup message 12 from the ISDN network 60 (step 801). Then, by the destination sub-address extraction and matching check portion 22, only sub-address is extracted from the address value field 44 in the destination sub-address information factor 41 of the call setup message 12 (step 802). The extraction of only sub-address can be performed by extracting the content from the leading end of the address value field 44 to the delimiter 32. Then, by the destination sub-address extracting and matching check portion 22, address matching check for the extracted sub-address against the sub-address 70 assigned to the own equipment to make judgement whether the incoming call is designated to the own equipment or not (steps 803 and 804). When judgement is made that the incoming call is for the own equipment, a response message as ISDN call control message is transmitted to the ISDN network 60 (step 805). On the other hand, as a result of address matching check, if the incoming call is not for the own equipment, the received call setup message is ignored or rejected (step 806). Rejection of the call setup message is performed by transmitting an open completion message.

Figure 9:
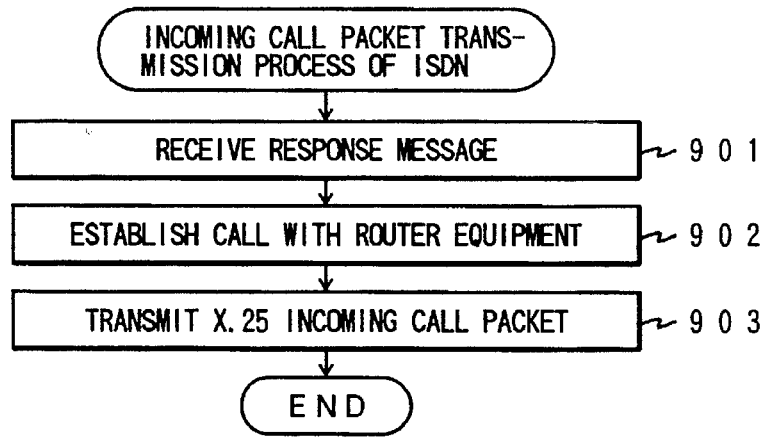
FIG. 9 is a flowchart showing a incoming packet feeding process from ISDN network.

Next, discussion will be given for an incoming packet transmitting process from the ISDN network 60 with reference to FIG. 9. The packet switch of the ISDN network 60 receives the response message from the called ISDN router equipment 20 (step 901). Then, the packet switch establishes an ISDN call to the called router equipment 20 (step 902). Then, with respect to the established ISDN call, the packet switch transmits the X.25 incoming call packet 13 (step 903). The incoming call address extended facility 51 of the X.25 incoming call packet 13 to be transmitted has the content as illustrated in FIG. 4. Namely, in the address value field 54, the same content to the address value field 34 set in the X.25 incoming packet of FIG. 2, namely the address values derived by dividing the sub-address 70 and the network address 80 by the delimiter 32.

Figure 10:
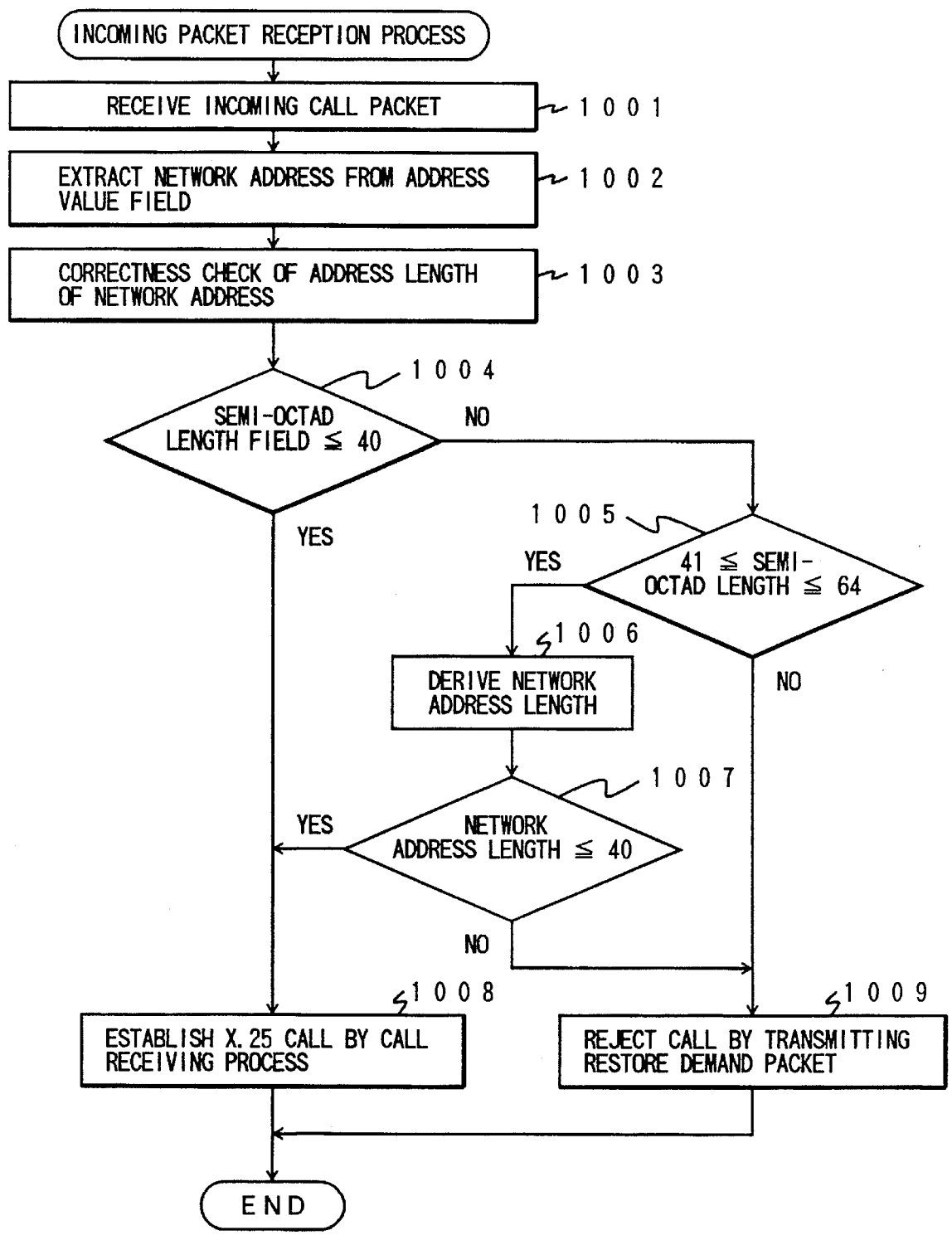
FIG. 10 is a flowchart showing a reception process of the incoming packet by the called router equipment.

Next, the incoming packet reception process by the called ISDN router equipment 20 will be discussed with reference to FIG. 10. The called ISDN router equipment 20 receives the X.25 incoming packet 13 from the ISDN network 60 (step 1001). Then, the called ISDN router 20 extracts the network address 80 from the address value field 54 in the incoming call address extending facility 51 of the X.25 incoming packet by the destination network address extracting and incoming call processing portion 23 (step 1002). Then, verification check of the address of the network address 80 is performed (step 1003). Thereafter, incoming call processing is performed with the network address to establish the X.25 call (step 1008).

When the maximum length of the network address is limited by the network upon verification of the address, the destination network address extracting and incoming call processing portion 23 makes judgement of correctness of the address length of the network address on the basis of the semi-octad length field 52 which determines the length of the address value field 54 (step 1004). When the address value field length is less than or equal to 40 semi-octad, correctness of the address length is judged to establish the ISDN call by performing the incoming call processing with the network address 80.

On the other hand, when the address value field length is greater than 41 semi-octad but less than 64 semi-octad (step 1005), judgement to the error is not instantly made. In such case, the address length of the network address 80 actually extracted from the address value field 54 is calculated (step 1006). On the basis of the calculated address length, verification of the correctness of the address length is performed (step 1007). Then, if no problem is found through verification process, the incoming call processing is performed. The address length of the network address 80 is derived by subtracting the address length of the sub-address 70 and the length of the delimiter 32 from the length indicated by the semi-octad length field 52 of the incoming call address extending facility 51.

In the step 1005, if the semi-octad length field 52 is greater than or equal to 64 semi-octad or, in the step 1007, the calculated address length of the network address exceeds 40 semi-octad, incoming call is rejected by transmitting a restore demand packet (step 1009).

As set forth above, in the shown embodiment, when the maximum length of the network address is limited by the network (e.g. up to 40 semi-octad), and the length of the address value field exceeds the limit value, the correctness of the address length of the network address is checked on the basis of the address length of the actually extracted network address without depending upon the value of the field defining the address field length. By performing check of the address length in this way, not only the network address but also the sub-address can be set in the network address, in which only network address is set in the prior art. Also, with the arrangement set forth above, it is permitted to set the length of the address value field beyond a limit value for the address length. Thus, it is avoided to instant judgement as error even when the address length of the network address exceeds the limit value of the address length.

Although the present invention has been disclosed in terms of one embodiment, the present invention should not be limited to the specific embodiment set forth above but can be made various modification, variations, addition, elimination in detail. For instance, the called equipment should not be limited to the called ISDN router equipment 1 shown in FIG. 20 but can be normal ISDN terminal equipment.

In the shown embodiment of the called equipment selection method in the ISDN packet switching mode, the calling equipment makes the call demand by setting the address value field of the incoming call address extending facility of the X.25 call demand packet with the pair of the sub-address of the called equipment and the network address of the destination end system. Then, the call setup message set with the content of the address value field in the X.25 call demand packet is transmitted from the ISDN network to the called equipment. The called equipment then extracts the sub-address from the address value field of the incoming call address extending facility to perform checking of matching of the extracted sub-address and own sub-address for making judgement whether the incoming call is to own equipment or not. With the method set forth above, the following advantages can be achieved.

At first, concerning judgement process whether the incoming call is for the own equipment or not, it is required to manage only one sub-address of as the address of own terminal independent of one or more network address group present in one terminal equipment in the case of called equipment under multi-point access environment.

Secondly, when the called equipment under multi-point connection environment serves as the router from the ISDN environment to other network environment, it is required to manage only one sub-address independent of the huge amount of the network address of other network environment.

Thus, the sub-address information to be managed by the called ISDN terminal equipment or the router equipment.

Furthermore, in the called equipment, only correctness of the address length of the network address is checked, and the process for address matching check with the network address is not required upon selection of the equipment, it becomes unnecessary to perform protocol identification upon selection of the called equipment even when a plurality of protocols are present in the called equipment. This reduces the process load of the called equipment.

It should be appreciated that when X.25 incoming call packet is transmitted from the ISDN network after transmitting the response message to the ISDN network, only network address is extracted from the address value field in the X.25 incoming call packet to establish the X.25 call to perform the incoming call processing. Therefore, communication with the destination end system can be of course done without any problem.

What is claimed is:

1. A called equipment selection method of establishing a network layer relay in a packet switching mode in a digital network including calling equipment and called equipment connected to said digital network for communication by packet switching, and further including a destination end system as an objective equipment to be connected to said called equipment for communication, comprising the steps of:

upon occurrence of a call demand by said calling equipment, setting a sub-address of said called equipment and a network address of said destination end system in a call demand packet and transmitting said call demand packet to said digital network;

in response to said call demand packet, transmitting a call setup message from said digital network to said called equipment;

upon reception of said call setup message by said called equipment from said digital network, extracting said sub-address from said call set up message and making a judgement as to whether the incoming call is designated to own equipment by checking for a matching of the extracted sub-address and a given sub-address assigned to own equipment, and transmitting a response message to said digital network when the incoming call is judged to be designated to own equipment;

in response to said response message, establishing a call and transmitting an incoming call packet from the digital network to said called equipment; and upon reception of said incoming call packet by said called equipment from said digital network extracting the network address from said incoming call packet and performing incoming call processing based on the extracted network address.

2. A called equipment selection method in a packet switching mode of a digital network, as set forth in claim 1, which further comprises the steps of:

upon the occurrence of the call demand, setting said sub-address of said called equipment and said network address of said destination end system in an address value field of said call demand packet;

upon reception of said call setup message by said called equipment, extracting said sub-address from the address value field of a destination sub-address information factor of said call setup message; and upon reception of said incoming packet by said called equipment, extracting the network address from said address value field.

3. A called equipment selection method in a packet switching mode of a digital network, as set forth in claim 1, which further comprises the step of separating said sub-address and said network address in said call demand packet by a delimiter.

4. A called equipment selection method in a packet switching mode of a digital network, as set forth in claim 2, which further comprises the step of separating said sub-address and said network address set in said call demand packet by a delimiter.

5. A called equipment selection method in a packet switching mode of a digital network, as set forth in claim 2, which further comprises the steps of:

checking correctness of the address length of said network address extracted from said incoming call packet upon reception of said incoming call packet by said called equipment;

making a judgement that the address length of said network address is correct whenever the length of the address value field of said incoming call packet is not greater than a maximum length of said network address; and checking correctness on the basis of the address length of the network address actually extracted without depending upon the address value field when the length of said address value field of said incoming call packet is greater than said maximum length.

6. A called equipment selection method in a packet switching mode in a ISDN network including calling equipment and called equipment connected to said ISDN network for communication by packet switching, and further including a destination end system as an objective equipment to be connected to said called equipment for communication, comprising the steps of:

upon occurrence of a call demand by said calling equipment, setting a sub-address of said called equipment and a network address of said destination end system in an address value field of an incoming call address extending facility of a call demand packet and transmitting said call demand packet to said ISDN network;

in response to said call demand packet, transmitting a call setup message from said ISDN network to said called equipment;

upon reception of said call setup message by said called equipment from said ISDN network, extracting said sub-address from an address value field of a destination sub-address information factor of said call setup message and making a judgement as to whether the incoming call is designated to own equipment by checking for a matching of the extracted sub-address and a given sub-address assigned to own equipment, and transmitting a response message to said ISDN network when the incoming call is judged to be designated to own equipment;

in response to said response message, establishing a call and transmitting an incoming call packet from said ISDN network to said called equipment; and upon reception of said incoming call packet by said called equipment from said ISDN network, extracting the network address from said incoming call packet and performing incoming call processing based on the extracted network address.

7. A called equipment selection method in a packet switching mode of a ISDN network, as set forth in claim 6, which further comprises the step of separating said sub-address and said network address in said address value field of said call demand packet by a delimiter.

8. A called equipment selection method in a packet switching mode of a ISDN network, as set forth in claim 6, which further comprises the steps of:

checking correctness of the address length of said network address extracted from said incoming call packet upon reception of said incoming call packet by said called equipment;

making a judgement that the address length of said network address is correct whenever the length of the address value field of said incoming call address extending facility of said incoming packet is not greater than a maximum length of said network address; and checking correctness on the basis of the address length of the network address actually extracted without depending upon the address value field when the length of said address value field of said incoming address extending facility of said incoming call packet is greater than said maximum length.

9. A packet switching system in a digital network including a calling equipment and called equipment connected to said digital network for communication by packet switching, and further including a destination end system as an objective equipment to be connected to said called equipment for communication, comprising:

an address setting means in said calling equipment for setting a sub-address of said called equipment and a network address of said destination end system in a call demand packet and transmitting said call demand packet to said digital network upon occurrence of a call demand in said calling equipment;

means in said digital network for sending a call setup message to said called equipment in response to the call demand packet;

an address extracting and matching check means in said called equipment for extracting said sub-address from said call setup message and making a judgement as to whether the incoming call is designated to own equipment by checking for a matching of the extracted sub-address and a given sub-address assigned to own equipment, and transmitting a response message to said digital network when the incoming call is judged to be designated to own equipment, upon reception of the call setup message by said called equipment from said digital network;

means in said digital network for establishing a call and transmitting an incoming call packet to said called equipment in response to said response message; and call receiving means in said called equipment for extracting the network address from said incoming call packet and performing incoming call processing based on the extracted network address, upon reception of the incoming call packet by said called equipment from said digital network.

10. A packet switching system as set forth in claim 9, wherein:

said address setting means of said calling equipment sets said sub-address of said called equipment and said network address of said destination end system in an address value field of an incoming call address extending facility of said call demand packet;

said address extracting and matching check means extracts said sub-address from the address value field of a destination sub-address information factor of said call setup message; and said call receiving means extracts the network address from said address value field of said incoming call address extending facility.

11. A packet switching system as set forth in claim 10, wherein said address setting means of said calling equipment separates said sub-address and said network address by a delimiter.

12. A packet switching system as set forth in claim 10, wherein said call receiving means includes an address checking means for checking correctness of the address length of said network address extracted from said incoming call packet upon reception of said incoming call packet by said called equipment;

means for making judgement that the address length of said network address is correct whenever the length of the address value field of said incoming call address extending facility of said incoming packet is not greater than a maximum length; and means for checking correctness on the basis of the address length of the network address actually extracted without depending upon the address value field when the length of said address value field of said incoming address extending facility of said incoming call packet is greater than said maximum length.

* * * * *